United States Patent [19]

Foo et al.

[11] Patent Number: 5,702,124
[45] Date of Patent: Dec. 30, 1997

[54] METHOD AND APPARATUS FOR SENSING A VEHICLE CRASH USING A DISPLACEMENT VELOCITY METRIC

[75] Inventors: Chek-Peng Foo, Ann Arbor; Huahn-Fern Yeh, Novi; Timothy Chester Wright; Anne Marie Shields, both of Ann Arbor, all of Mich.

[73] Assignee: TRW Inc., Lyndhust, Ohio

[21] Appl. No.: 635,698

[22] Filed: Apr. 22, 1996

[51] Int. Cl.⁶ ............................................. B60R 21/32
[52] U.S. Cl. ................... 280/735; 307/10.1; 364/424.05
[58] Field of Search .................... 280/735; 307/10.1; 364/424.05

[56] References Cited

U.S. PATENT DOCUMENTS

| | | | |
|---|---|---|---|
| 5,014,810 | 5/1991 | Mattes et al. | 180/268 |
| 5,040,118 | 8/1991 | Diller | 364/424.05 |
| 5,068,793 | 11/1991 | Condne et al. | 364/424.05 |
| 5,157,268 | 10/1992 | Spies et al. | 307/10.1 |
| 5,377,108 | 12/1994 | Nishio | 364/424.05 |
| 5,430,649 | 7/1995 | Cashler et al. | 364/424.05 |
| 5,440,485 | 8/1995 | Okimoto et al. | 280/735 |
| 5,449,198 | 9/1995 | Jeenicke et al. | 280/735 |
| 5,475,269 | 12/1995 | Takeuchi | 280/735 |
| 5,483,451 | 1/1996 | Ohmae et al. | 280/735 |
| 5,504,379 | 4/1996 | Blackburn et al. | 307/10.1 |
| 5,513,109 | 4/1996 | Fujishima | 280/735 |

*Primary Examiner*—Kenneth R. Rice
*Attorney, Agent, or Firm*—Tarolli, Sundheim, Covell, Tummino & Szabo

[57] ABSTRACT

A vehicle crash sensing arrangement includes an accelerometer (12). A crash velocity value (26) is determined in response to sensed crash acceleration. A crash displacement value (32) is determined from the sensed crash acceleration. A velocity varying displacement threshold value (36) determined. The crash displacement value (32) is compared (38) against the variable displacement threshold value (36). The comparator (38) provides a signal indicative of a vehicle crash condition when the crash displacement value is greater than the displacement threshold value.

10 Claims, 3 Drawing Sheets

METHOD AND APPARATUS FOR SENSING A VEHICLE CRASH USING A DISPLACEMENT VELOCITY METRIC

TECHNICAL FIELD

The present invention is directed to an occupant restraint system and is particularly directed to a method and apparatus for sensing a vehicle crash using a displacement-velocity metric.

BACKGROUND

Vehicle safety restraint systems for detecting the occurrence of a vehicle crash and actuating a safety restraint in response to such a detected crash are known in the art. Such systems typically include an accelerometer mounted to the vehicle. A controller, usually containing a microcomputer, processes the accelerometer output signal to generate one or more signals whose magnitudes vary with crash intensity in known ways. The processing may be such that the signal (or "metric") is representative of "crash velocity" (mathematically, the first integral of acceleration) or "crash displacement" (mathematically, the second integral of acceleration), or "crash energy" (mathematically, proportional to the square of acceleration), or some other physical property of the developing crash. The controller compares each metric against an associated threshold to determine when the violence of the crash is such that the vehicles occupant restraint systems (air bags, seat belt retractors, etc.) should be activated. Each threshold may be fixed and unchanging, but it is also known to vary such a threshold as a function of time such that different thresholds are in effect at different times during the crash event.

U.S. Ser. No. 08/311,571, filed Sep. 23, 1994, to Blackburn et al., now U.S. Pat. No. 5,504,379, teaches a crash algorithm wherein the monitored metric is crash velocity. In this Blackburn system, the crash velocity is compared against a threshold, and the threshold is varied as a function of crash displacement rather than time. In such a system, the algorithm is said to monitor "crash velocity as a function of crash displacement", since the operation of such an algorithm can be conveniently displayed on a graph where crash velocity is charted on the vertical axis and crash displacement is charted on the horizontal axis.

SUMMARY OF THE INVENTION

In accordance with the present invention, a method and apparatus are provided for sensing a vehicle crash using a displacement-velocity metric. The crash displacement is compared against a threshold value that is varied as a function of crash velocity.

In accordance with the present invention, an apparatus is provided for sensing a vehicle crash comprising means for determining a crash velocity value and means for determining a crash displacement value. Threshold determining means determines a displacement threshold value functionally related to the crash velocity value. The apparatus further includes control means operatively connected to the displacement determining means and the threshold determining means for providing a signal indicative of a vehicle crash when the crash displacement value is greater than the threshold value.

Also in accordance with the present invention, a method for sensing a vehicle crash is provided including the steps of sensing vehicle crash acceleration, determining a crash velocity value from the sensed crash acceleration, and determining a crash displacement value in response to sensed crash acceleration. A threshold value is selected in response to the determined velocity value. The method further includes the steps of comparing the determined displacement value against the selected threshold value and providing an actuation signal when the comparing step indicates the determined displacement value is greater than the selected threshold value.

BRIEF DESCRIPTION OF THE DRAWINGS

Other features and advantages of the present invention will become apparent to those skilled in the art to which the present invention relates from a reading of the following detailed description with reference to the accompanying drawings, in which.

DESCRIPTION OF THE PREFERRED EMBODIMENT

Figure 1:
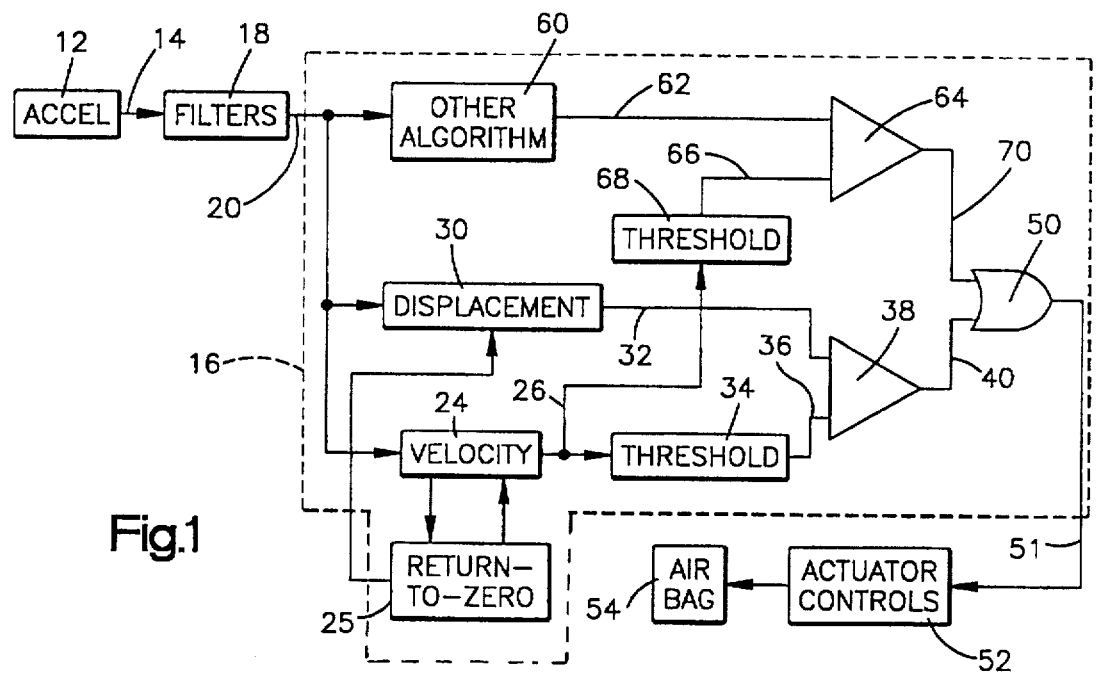
FIG. 1 is a schematic diagram illustrating a vehicle crash sensing system in accordance with one embodiment of the present invention.

Referring to FIG. 1, a restraint system 10, in accordance with the present invention, includes an accelerometer 12 mounted at an appropriate location in the vehicle for sensing crash acceleration. Although the present invention is described with regard to sensing of frontal crash conditions, it is also applicable for sensing side or rearward crash conditions. The accelerometer 12 provides a signal 14 indicative of crash acceleration. Any of the various types of known acceleration sensors may be used. The accelerometer 12 is operatively coupled to a controller 16 through an anti-alias filter 18.

The controller 16 preferably is a microcomputer. The functions performed by the microcomputer are shown in block form for convenience of description. Suitable software modules for implementing the illustrated functions are well known in the art. These functions could alternatively be performed using discrete circuit components. If a microcomputer is used, the filtered acceleration signal 20 would be connected to an internal analog-to-digital ("A/D") converter (not shown) of the controller 16. The A/D converter would convert the analog acceleration signal into a digital value for further processing. The rate of the conversions is selected in accordance with known sampling criteria to assure that a reliable representation of the analog acceleration signal is obtained.

A velocity determining function 24 of controller 16 calculates a crash velocity value 26 in response to the monitored crash acceleration signal. The value of the crash velocity signal 26 is calculated by integrating the acceleration signal. The crash acceleration signal 20 also is provided to a displacement determining function 30. The displacement determining function 30 calculates a crash displacement value 32 by, preferably, double integrating the crash acceleration signal 20. Preferably, the velocity determining function 24 has an associated return-to-zero function 25 associated therewith to return the velocity value back to zero after an acceleration condition ends. Such return-to-zero function is accomplished by subtracting a small increment value from the then present velocity value each cycle in which the velocity value is calculated. In this way, if the acceleration value goes to and remains at zero for a certain time period, the velocity value will decrease each machine cycle or program loop by the incremental amount until it reaches zero. In accordance with a preferred embodiment, the displacement value is reset to zero when the velocity value is returned to zero.

The crash velocity signal 26 is provided to a displacement threshold determining function 34. The displacement threshold determining function 34 provides a displacement threshold signal 36 having a value functionally related to the value of the crash velocity signal 26. Any one of a plurality of possible functional relationships between the value of the crash velocity signal 26 and the value of the displacement threshold signal 36 are contemplated by the present invention. The functional relationship would preferably be empirically determined for each vehicle platform of interest. A currently preferred threshold profile is shown at 36 in FIGS. 3 and 5. The displacement threshold value 36 can be stored in a look-up table and accessed as a function of the velocity value 26 or can be calculated in real time in accordance with a predetermined equation associated with a particular vehicle platform.

The displacement threshold value 36 is provided to one input of a comparator function 38. The other input of the comparator function 38 is supplied with the crash displacement value 32. The comparator function 38 compares the value of the crash displacement value 32 against the value of the displacement threshold value 36. As long as the value of the crash displacement value 32 is less than the value of the displacement threshold value 36, the output 40 of comparator function 38 is LOW. If the value of the crash displacement value 32 exceeds the value of the displacement threshold signal 36, however, then the output of the comparator function 38 is HIGH. This condition indicates that the crash event is a deployment crash condition, i.e., one in which it is desirable to actuate the restraint device.

The output of the comparator function 38 is coupled to one input of an ORing function 50. The output of the ORing function, which is the output 51 of the controller 16, is coupled to an actuator control circuit 52. The actuator control circuit 52 is operatively connected to an actuatable restraint device such as an air bag 54. When the output of the comparator function 38 is HIGH, the output 51 of the controller 16 is HIGH, which results in actuation of the air bag 54.

Figure 2:
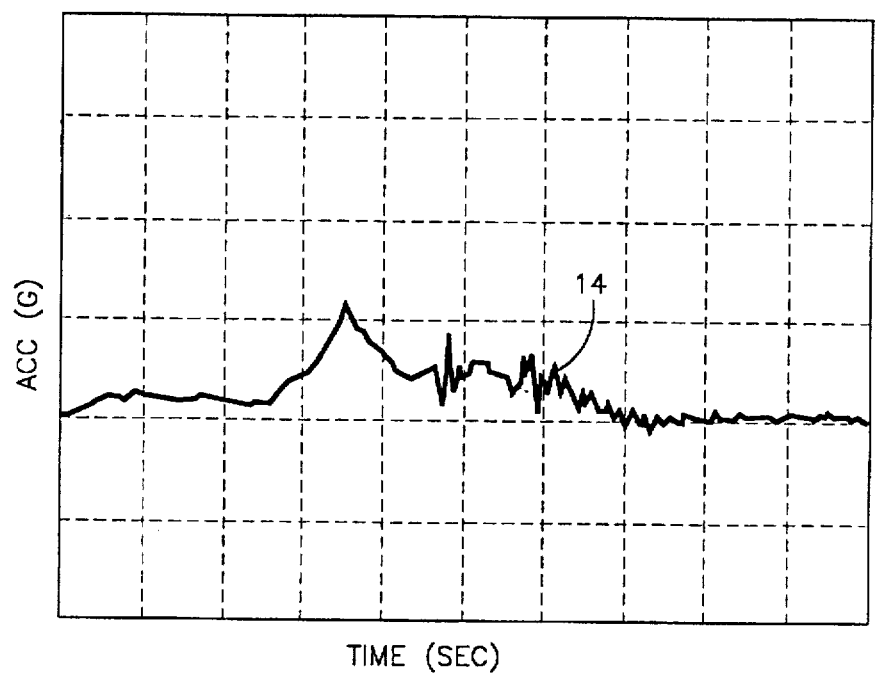
FIG. 2 is a graphical representation of a crash acceleration signal as a function of time for a non-deployment crash event.
Figure 3:
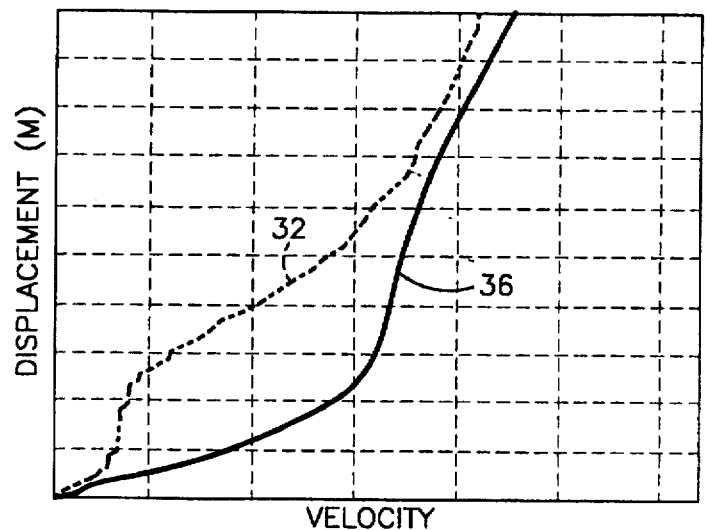
FIG. 3 is a graphical representation of a crash displacement signal as a function of crash velocity for the crash event depicted in FIG. 2.

Referring to FIG. 2, an acceleration signal for a non-deployment crash event is charted as a function of time for a particular vehicle platform. FIG. 3 shows the determined crash displacement 32 as a function of determined crash velocity 26 for the crash event depicted in FIG. 2. In FIG. 3, it can be seen that the displacement threshold 36 changes as function of the crash velocity 26. The crash displacement value 32 does not exceed the displacement threshold value 36 as the crash event develops. Under this condition, the output of comparator function 38 remains LOW and does not cause the air bag 54 to be actuated.

Figure 4:
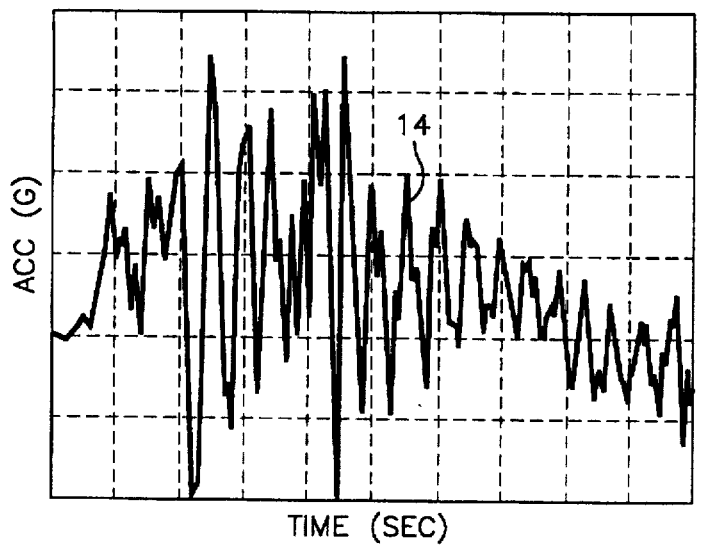
FIG. 4 is a graphical representation of a crash acceleration signal as a function of time for a deployment crash event.
Figure 5:
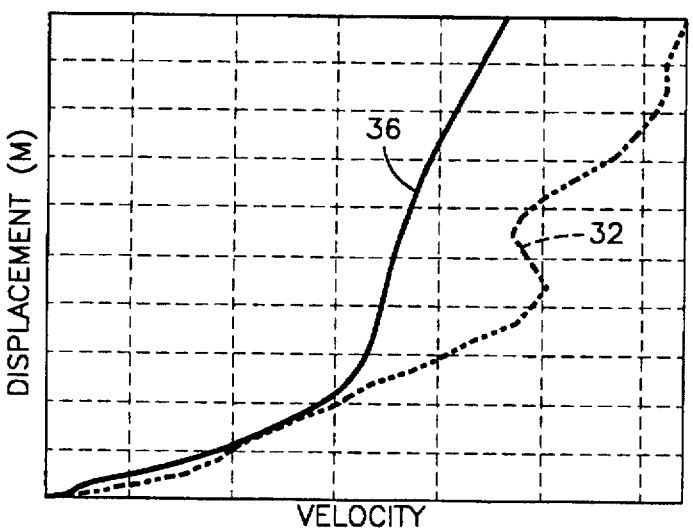
FIG. 5 is a graphical representation of a crash displacement signal as a function of crash velocity for the crash event depicted in FIG. 4.

Referring to FIG. 4, an acceleration signal for a deployment crash event is charted as a function of time for a particular vehicle platform. FIG. 5 shows the determined crash displacement 32 as a function of determined crash velocity 26 for the crash event depicted in FIG. 4. The profile of the displacement threshold 36 is the same as shown in FIG. 3. The crash displacement value 32 does exceed the displacement threshold value 36 during the crash event. Under this condition, the air bag 54 is actuated.

Referring back to FIG. 1, one or more other crash algorithms can be ORed with the displacement-velocity algorithm described. The filtered acceleration signal 20 is connected with other algorithm determining function(s) 60. This other algorithm determining function 60 can calculate other known crash metric values such as crash energy, crash jerk, etc. For example, crash metrics such as those disclosed in co-pending patent application U.S. Ser. No. 258,952 to McIver et al. filed Jun. 13, 1994, and hereby incorporated herein by reference, can be used. These crash metrics include AMAX, ASQ, and ASUM. AMAX is a value directly proportional to the crash acceleration. ASQ is a value proportional to the square of the crash acceleration. ASUM is a value proportional to the sum of the squares of the crash acceleration. Preferably, the other algorithm 60 would include only one metric equal to ASQ, which is the value proportional to the square of the acceleration value. It has been found that ASQ provides a significant contributing factor to the discrimination of a deployment crash event for most vehicle platforms.

A crash metric value 62 is connected to one input of a comparator function 64. A crash threshold value 66 from a crash threshold determining function 68 is connected to the other input of the comparator function 64. The crash threshold determining function 68 is connected to the velocity value 26 and varies as a function of the crash velocity value 26. The output 70 of the comparator function 64 is connected to the other input of the ORing function 50.

One skilled in the art will understand that the functional relationship between the displacement threshold value 34 and the crash velocity value 26 shown in FIGS. 3 and 5 is by no means the only functional relationship possible and is in no way meant to limit the present invention to such functional relationship. By empirically testing a vehicle platform of interest and predetermining the desired deployment conditions, the displacement threshold value as a function of velocity can then be determined. The profile of the displacement threshold value can either be stored as an equation relating threshold to velocity or as a look-up table having prestored values of displacement thresholds versus velocity. The threshold values 68 that vary in response to the velocity value can be similarly determined by equation or prestored threshold values in a look-up table.

Figure 6:
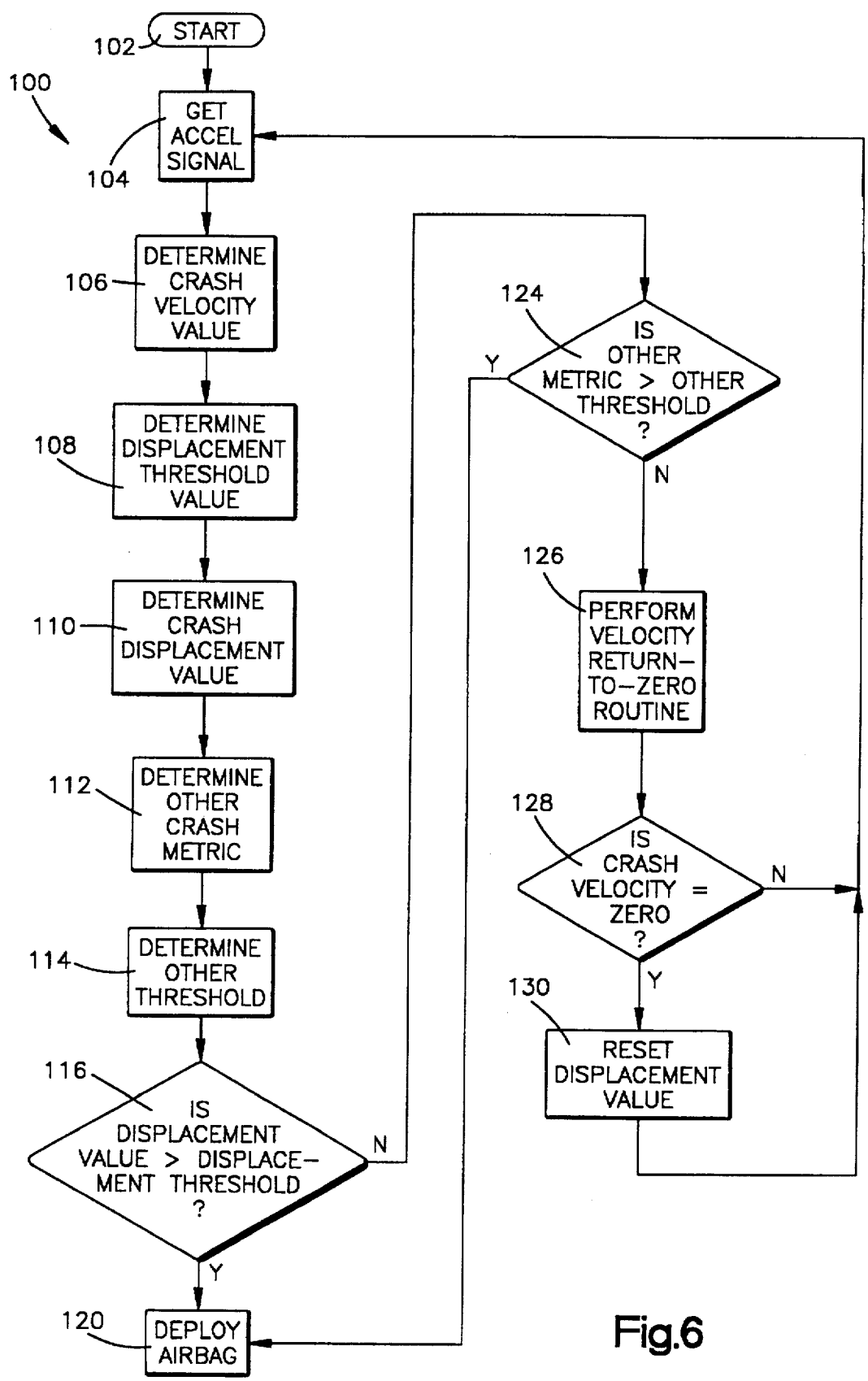
FIG. 6 is a flow chart showing a control process in accordance with the present invention for use with the system shown in FIG. 1.

Referring to FIG. 6, a control process 100 starts at step 102 where the controller 16 resets internal registers, sets flags to initial conditions, etc., in a manner well known in the art. The process proceeds to step 104 where the controller 16 gets the acceleration signal output from the filter 18. If controller 16 is a microcomputer, the get acceleration signal step 104 is the conversion performed by the internal A/D converter. The process then proceeds to step 106 where the crash velocity value is determined by integrating the acceleration signal. The process proceeds to step 108 where the displacement threshold value is determined either by use of an equation defining the functional relationship between displacement threshold and velocity or is determined through use of an internal look-up table having prestored values defining the functional relationship between the displacement threshold and velocity.

The process proceeds to step 110 where the crash displacement value is determined by double integrating the acceleration signal. The process then proceeds to step 112 where any other desired crash metric value is determined. For example, if the other crash metric value is functionally related to a square of the acceleration signal, such metric would be determined in step 112. In step 114, a threshold value for use with the other determined crash metric is determined in response to the velocity value determined in step 106. Again, this threshold value may be determined by use of an equation or may be determined using a look-up table having prestored values defining the functional relationship between that threshold value for the other crash metric and the velocity value.

In step 116, a determination is made as to whether the displacement value determined in step 110 is greater than the displacement threshold value determined in step 108. If the determination in step 116 is affirmative, the process proceeds to step 120 where the actuatable restraint, e.g., an air bag, is actuated. If the determination in step 116 is negative, the process proceeds to step 124. In step 124, a determination is made as to whether the other metric value determined in step 112 is greater than the other threshold value determined in step 114. If the determination in step 124 is affirmative, the process proceeds to step 120 where the restraint is actuated.

If the determination in step 124 is negative, the process proceeds to step 126. In step 126, the process performs the velocity return-to-zero sub-routine. This sub-routine subtracts a small incremental value from the velocity value determined in step 106 during each machine cycle of the process. If the acceleration signal returns to substantially a zero value, step 126 will return the velocity value eventually back to zero after the process from steps 104–128 are repeated a sufficient number of times. The process in step 128, determines whether the crash velocity value is equal to zero. If the determination in step 128 is negative, the process returns to step 104 where the controller 116 gets the next acceleration signal. Again, if the acceleration signal goes to a substantially zero value, the cycle through steps 104 to steps 128 will eventually return the velocity value to zero.

If the determination in step 128 is affirmative, the process proceeds to step 130. In step 130, the displacement value determined in step 110 is reset to a zero value. It should be appreciated that the displacement value is reset to zero when the velocity value has returned to zero.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for sensing a vehicle crash comprising:
    means for determining a crash velocity value;
    means for determining a crash displacement value;
    threshold determining means for determining a displacement threshold value functionally related to said crash velocity value; and
    control means operatively connected to said displacement determining means and said displacement threshold determining means for providing a signal indicative of a vehicle crash when the crash displacement value is greater than said displacement threshold value.

2. An apparatus for sensing a vehicle crash comprising:
    acceleration sensing means for sensing vehicle acceleration and providing a signal indicative of crash acceleration;
    velocity determining means for determining a crash velocity value in response to said crash acceleration signal;
    displacement determining means for determining a crash displacement value in response to said crash acceleration signal;
    threshold determining means for providing a displacement threshold value functionally related to said determined crash velocity value; and
    means for comparing said crash displacement value against said displacement threshold value and providing an actuation signal when said crash displacement value is greater than said displacement threshold value.

3. The apparatus of claim 2 further including actuatable restraining device and means to actuate said actuatable restraining device when said means for comparing provides said actuation signal.

4. The apparatus of claim 2 further including means for determining a crash metric value in response to said crash acceleration signal, means for determining a crash metric threshold value functionally related to said crash velocity value, second comparing means for comparing said crash metric value against said crash metric threshold value, said means for providing said actuation signal being further responsive to said second comparing means.

5. The apparatus of claim 4 wherein said crash metric value is functionally related to the square of the crash acceleration.

6. The apparatus of claim 2 further including means for returning said crash velocity value to zero when said crash acceleration value becomes substantially zero.

7. The apparatus of claim 6 further including means for resetting said determined crash displacement value to zero when said crash velocity value is returned to zero.

8. A method for sensing a vehicle crash condition including the steps of:
    sensing vehicle crash acceleration;
    determining a crash velocity value from said sensed crash acceleration;
    determining a crash displacement value in response to said crash acceleration;
    selecting a displacement threshold value in response to said determined crash velocity value;
    comparing said determined crash displacement value against said selected displacement threshold value; and
    providing an actuation signal when said comparing step indicates said selected crash displacement value is greater than said determined displacement threshold value.

9. The method of claim 8 further including the step of returning the determined velocity value to zero when said sensed crash acceleration becomes substantially zero.

10. The method of claim 9 further including the step of resetting said determined crash displacement value to zero when said crash velocity value is returned to zero.

* * * * *

UNITED STATES PATENT AND TRADEMARK OFFICE
CERTIFICATE OF CORRECTION

PATENT NO. : 5 702 124
DATED : December 30, 1997
INVENTOR(S) : Chek-Peng Foo, Huan-Fern Yeh, Timothy Chester Wright and Anne Marie Shields It is certified that error appears in the above-indentified patent and that said Letters Patent is hereby corrected as shown below:

Column 3, line 37, change "is less than" to --exceeds--.

Column 3, line 40, change "exceeds" to --is less than--.

Signed and Sealed this

Sixth Day of October, 1998

*Attest:*

BRUCE LEHMAN

*Attesting Officer*       Commissioner of Patents and Trademarks